United States Patent [19]

Krajewski

[11] 4,423,420

[45] Dec. 27, 1983

[54] CANCELLATION OF GROUP DELAY ERROR BY DUAL SPEED OF ROTATION

[75] Inventor: Zdzistaw A. A. Krajewski, Ajax, Canada

[73] Assignee: Bayly Engineering Limited, Ajax, Canada

[21] Appl. No.: 261,286

[22] Filed: May 6, 1981

[30] Foreign Application Priority Data

May 15, 1980 [CA] Canada .................................. 352008

[51] Int. Cl.$^3$ .............................................. G01S 1/44
[52] U.S. Cl. .................................................. 343/400
[58] Field of Search .......... 343/106 R, 108 M, 113 R, 343/120; 364/451

[56] References Cited

U.S. PATENT DOCUMENTS 3,950,753  4/1976  Chisholm ........................ 343/106 R Primary Examiner—Theodore M. Blum
Attorney, Agent, or Firm—Wenderoth, Lind & Ponack

[57] ABSTRACT

Radio direction finders using the principle of periodic scanning of a circular array inherently display a bearing error related to the group delay through the receiving, detection and evaluation process. Correcting by subtracting a constant $\theta_o$ is simple but it is difficult to keep $\theta_o$ constant. The present invention cancels the group delay error instead of compensating for it with a predetermined constant. Scanning is done at angular velocities $\Omega_1$ and $\Omega_2$ for m turns and n turns respectively. The parameters are related by the formulae $$\omega_2/\omega_1 = m/n \quad (1)$$

$$n - m = 1 \quad (2)$$

Group delay errors are cancelled by computing the true bearing from the formula $$n\theta_2 - m\theta_1 = \theta$$

where $\theta_1$ and $\theta_2$ are the bearing readings at $\omega_1$ and $\omega_2$ respectively and $\theta$ is the true bearing of the radio target.

7 Claims, 3 Drawing Figures

CANCELLATION OF GROUP DELAY ERROR BY DUAL SPEED OF ROTATION

BACKGROUND OF THE INVENTION

This invention relates to radio direction finders and, more particularly, to a radio direction finding method and system which enables an accurate determination of the true bearing of a radio target by cancelling errors caused by group delays through the receiving, detection and evaluation process.

Radio direction finders utilizing the principle of periodic scanning of a circular antenna array inherently display a bearing error related to the group delay through the receiving, detection and evaluation process. Thus, a finite time elapses between the instant when the sampled antenna (or antennas) cross the target line and the moment when the signal from that sample is compared with the fixed reference angle.

When a circular antenna array is scanned to determine the direction, with respect to a reference direction, of a radio wave arriving from a radio target, a signal from the target is received at the antenna when in a given position, but it does not become detected until after a time which corresponds to the group delay of the system. At the time when the detected signal is compared with the reference, the sampled antenna has advanced to a new position, and the indicated bearing angle differs from the true bearing angle by an increment $\theta$ corresponding to the angle swept by the antenna during the group delay interval $T_O$.

In a conventional radio direction finder, based on periodic scanning of a circular antenna array, the group delay error is corrected by displacing the phase of the reference by a fixed constant corresponding to $\theta_o$ in such a way as to make the bearing indicator read the true bearing angle $\theta$ directly. This method has an advantage of simplicity but it is subject to errors in the assumption that $\theta_o$ can be maintained constant.

The factors which influence the value of $\theta_o = \omega t_o$ are:
 (i) The angular velocity of scanning, $\omega$;
 (ii) The group delay $t_o$ of the receiver subsystem.

Item (i) can be kept constant with sufficiently high accuracy.

Item (ii), however, largely depends on the passband filter characteristics of the receiver where the group delay will vary with the tuning frequency inside the passband. Depending on the design of the filter, a practical variation may be some ±30% of the centre value of $t_o$. This means, that $\theta_o$ could similarly vary by ±30%, as the signal is detuned, and the fixed correction applied to the reference angle is no longer adequate.

Maintaining the receiver tuned exactly to the centre frequency is not always practical for the following reasons:
 (i) The target transmitter may be drifting in time;
 (ii) The apparent transmitter frequency may vary with the target's movement relative to the DF site due to the Doppler effect;
 (iii) The intelligence modulation of the target transmission may exhibit an assymetrical spectrum (such as SSB or suppressed carrier, etc.) and the average group delay may differ from that at the centre frequency.

SUMMARY OF THE INVENTION

A novel method is described here, which overcomes the above difficulties by cancelling the group delay error rather than compensating for it with a preadjusted constant. In the proposed method, the basic elements of the system remain the same, i.e. a circular antenna array is scanned in a cyclical or periodic fashion and the resultant signal is applied via a radio receiver to a bearing processor. The innovation lies in scanning the antenna alternately at two different angular velocities $\omega_1$ and $\omega_2$:

First, the antenna array is scanned for m complete turns at a velocity of $\omega_1$ and then for n complete revolutions at a velocity of $\omega_2$, algebraically related so that $$\omega_2/\omega_1 = m/n$$

and $$n - m = 1$$

Two different bearings, $\theta_1$ and $\theta_2$ will be obtained at the respective scanning velocities $\omega_1$ and $\omega_2$. The true bearing angle $\theta$ of the target is computed by cumulatively adding n times the bearing angle $\theta_2$ at the velocity $\omega_2$ and substracting from it the cumulative sum of m times the bearing angle $\theta_1$, at the velocity $\omega_1$, thus:

$$n\theta_2 - m\theta_1 = \theta$$

Thus, in accordance with one broad aspect of the invention, there is provided a radio direction finding method comprising scanning a circular antenna array alternately at first and second different angular velocities $\omega_1$ and $\omega_2$, scanning at angular velocity $\omega_1$ being done for m turns and scanning at angular velocity $\omega_2$ being done for n turns, the parameters, m, n, $\omega_1$ and $\omega_2$ being related by the formulae $$\omega_2/\omega_1 = m/n \quad (1)$$

and $$n - m = 1 \quad (2)$$

whereby a cancellation of group delay errors in receiving equipment connected to antenna is obtained by computing the true bearing of a radio target from the formula $$n\theta_2 - m\theta_1 = \theta \quad (3)$$

where $\theta_1$ and $\theta_2$ are radio target bearing readings obtained at the angular velocities $\omega_1$ and $\omega_2$ respectively and $\theta$ is the true bearing angle of said radio target.

In accordance with another aspect of the invention, there is provided a radio direction finding system comprising a circular antenna array, means for scanning the antenna array alternately at first and second different angular velocities $\omega_1$ and $\omega_2$ scanning at angular velocity $\omega_1$ being done for m turns and scanning at angular velocity $\omega_2$ being done for n turns, the parameters m, n, $\omega_1$ and $\omega_2$ being related by the formulae $$\omega_2/\omega_1 = m/n \quad (1)$$

and $$n - m = 1 \quad (2)$$

whereby a cancellation of group delay errors in receiving equipment connected to the antenna is obtained by means for computing the true bearing of a radio target from the formula $$n\theta_2 - m\theta_1 = \theta \tag{3}$$

where $\theta_1$ and $\theta_2$ are radio target bearing readings obtained at the angular velocities $\omega_1$ and $\omega_2$ respectively and $\theta$ is the true bearing angle of said radio target.

BRIEF DESCRIPTION OF THE DRAWINGS

The invention will now be further described in conjunction with the accompanying drawings, in which.

DESCRIPTION OF THE PREFERRED EMBODIMENT

Figure 1:
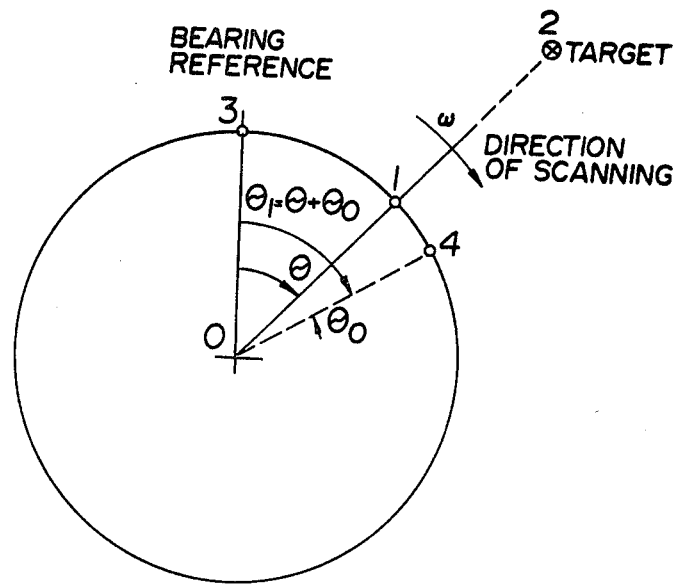
FIG. 1 is a diagram useful in explaining errors in radio direction finding due to group delays.

Referring to FIG. 1, let the circle with the centre O represent the antenna array or the locus of antenna rotation. Let point 1 represent the position of the sampled antenna when it is aligned with the direction of the radio wave arriving from the radio target (2). Let point 3 be the bearing angle reference, such as North, or vehicle, or ship's heading. Assuming the direction of scanning as shown, the angle $\theta$ is the true bearing angle of the electromagnetic field intercepted at the antenna site. A signal from the target is received at the antenna when in position 1, but it does not become detected until after a time $t_o$ corresponding to the group delay of the system.

At the time when the detected signal is compared with the reference, the sampled antenna has advanced to a new position 4, and the indicated bearing angle $\theta_1$ differs from the true bearing $\theta$ by an increment $\theta_0$ corresponding to the angle swept by the antenna during the group delay interval $t_o$, such that:

$$\theta_0 = \omega t_o$$

where $\omega$ is the angular velocity of scanning.

This principle of operation of the present invention can be illustrated as follows.

Figure 2:
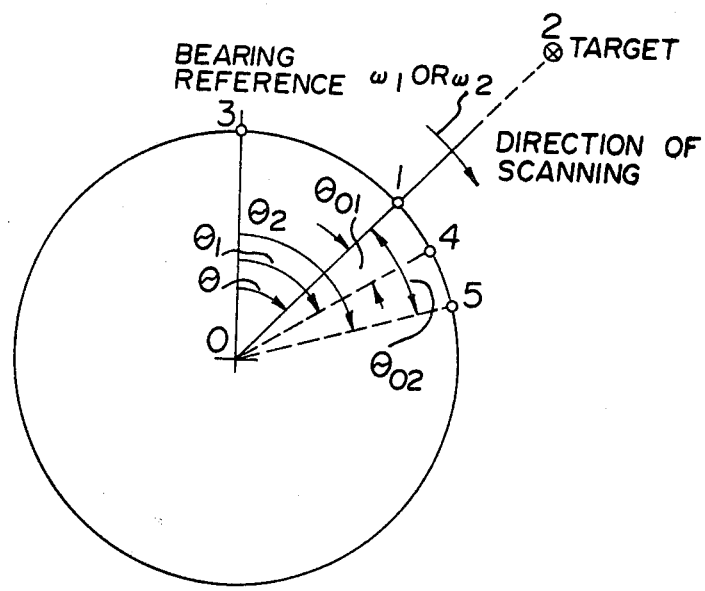
FIG. 2 is a diagram useful in explaining how the present invention cancels group delay errors.

Referring to FIG. 2, let the bearing angle at which the target appears at the antenna site be $\theta$ corresponding to position 1 of the antenna.

Let $\theta_1$ be the bearing angle obtained at the angular velocity of $\omega_1$ as measured over m complete turns and producing a group delay error of $\theta_{01}$ as exemplified by the position 4 of the sampled antenna.

Thus, $$\theta_1 = \theta + \theta_{01}$$

Let $\theta_2$ be the bearing angle subsequently obtained at the angular velocity of $\omega_2$ as measured over n complete turns, and producing a group delay error of $\theta_{02}$ as exemplified by the position 5 of the sampled antenna.

Thus, $$\theta_2 = \theta + \theta_{02}$$

Assuming that the group delay $t_o$ remains constant (the time involved is short), the two group delay errors $\theta_{01}$ and $\theta_{02}$ are related by $$\theta_{01}/\omega_1 = \theta_{02}/\omega_2 = t_o$$

or $$\theta_{02}/\theta_{01} = \omega_2/\omega_1 = m/n$$

Substituting the derived quantities for $\theta_1$ and $\theta_2$ in the computed expression $n\theta_2 - m\theta_1$ we obtain:

$$n\theta_2 - m\theta_1 = n(\theta + \theta_{02}) - m(\theta + \theta_{01})$$

$$= n\theta + n\frac{m}{n}\theta_{01} - m\theta - m\theta_{01}$$

$$= (n - m)\theta$$

$$= \theta \text{ (since } n - m = 1\text{)}$$

which demonstrates that the group delay errors have been cancelled out.

It is to be noted that the parameters n, m, $\omega_1$ and $\omega_2$ may assume negative or fractional values without invalidating the principle of operation here described. The significance of a negative angular velocity is that the rotation of scanning is exercised in the direction opposite to that assumed as reference.

It also follows that both m and n can be multiplied by the same constant, such as k, where the resulting difference has to be divided by the same constant k to obtain the bearing $\theta$, thus computing:

$$kn\theta_2 - km\theta_1 = k\theta, \text{ or } \theta = (kn\theta_2 - km\theta_1)/k$$

The significance of the latter provision is that averaging over a number of periods k can be used to obtain better bearing accuracy in the presence of random noise.

In practical terms the bearing angles are cumulatively measured over the respective m and n revolutions and the results subtracted to obtain the true bearing $\theta$. Full advantage can be derived from this method if the following conditions are observed:

(i) The frequency ratio $\omega_1/\omega_2$ and the values of m and n are accurately maintained.

(ii) The group delay $t_o$ does not change between the alternate scanning periods.

Condition (i) can be easily met by synchronizing $\omega_1$ and $\omega_2$ to consecutive subharmonics or harmonics of the same master frequency.

Condition (ii) can be fulfilled if the total time to scan m turns at $\omega_1$ and n turns at $\omega_2$ is short enough to reduce the effect of transmitter frequency drift to negligible proportions.

The total time T to obtain the true bearing angle $\theta$ of the target can be computed by adding the scanning times at the two different frequencies $\omega_1$ and $\omega_2$:

Thus, $$T = 2\pi m/\omega_1 + 2\pi n/\omega_2$$

which reduces to $$T = (2\pi m/\omega_1) \quad 1 + (n^2 m^2)$$

since $$\omega_2/\omega_1 = m/n$$

by definition.

The choice of the angular scanning velocity of $\omega_1$ and of the numerical values for the numbers of rotations m and n is a subject of compromise between a multiplicity of factors:

(i) The shortest total time T to indicate a bearing requires a small number of rotations and/or a high velocity of scanning.
(ii) Recovery of signal from random noise, requires high numbers of revolutions of m and n in order to average out the effects of noise.
(iii) Minimum time required to sample each antenna element, depending on switching speeds, the number of antenna elements and the receiver bandwidth together set up an upper limit on the value of scanning frequency.

Optimum parameters have to be selected in accordance with the type of design and its application, paying due attention to the physical limitations of the components and circuits.

One particular embodiment of the above invention relates to a Doppler-type radio direction finder provided either with a sequentially scanned circular antenna array or with a mechanically rotating dipole pair. Equipment of this type typically produces an output waveform at the scanning frequency which presents frequency or phase modulation of the received signal generated as the result of the scanning.

The fundamental component of this waveform is a sine wave, the phase of which represents the position of the transmitting target subject to a displacement caused by the group delay. In accordance with the described invention, the true bearing angle can be obtained by cancelling out the group delay displacement by means of scanning the antenna array alternatively at two different angular velocities.

Figure 3:
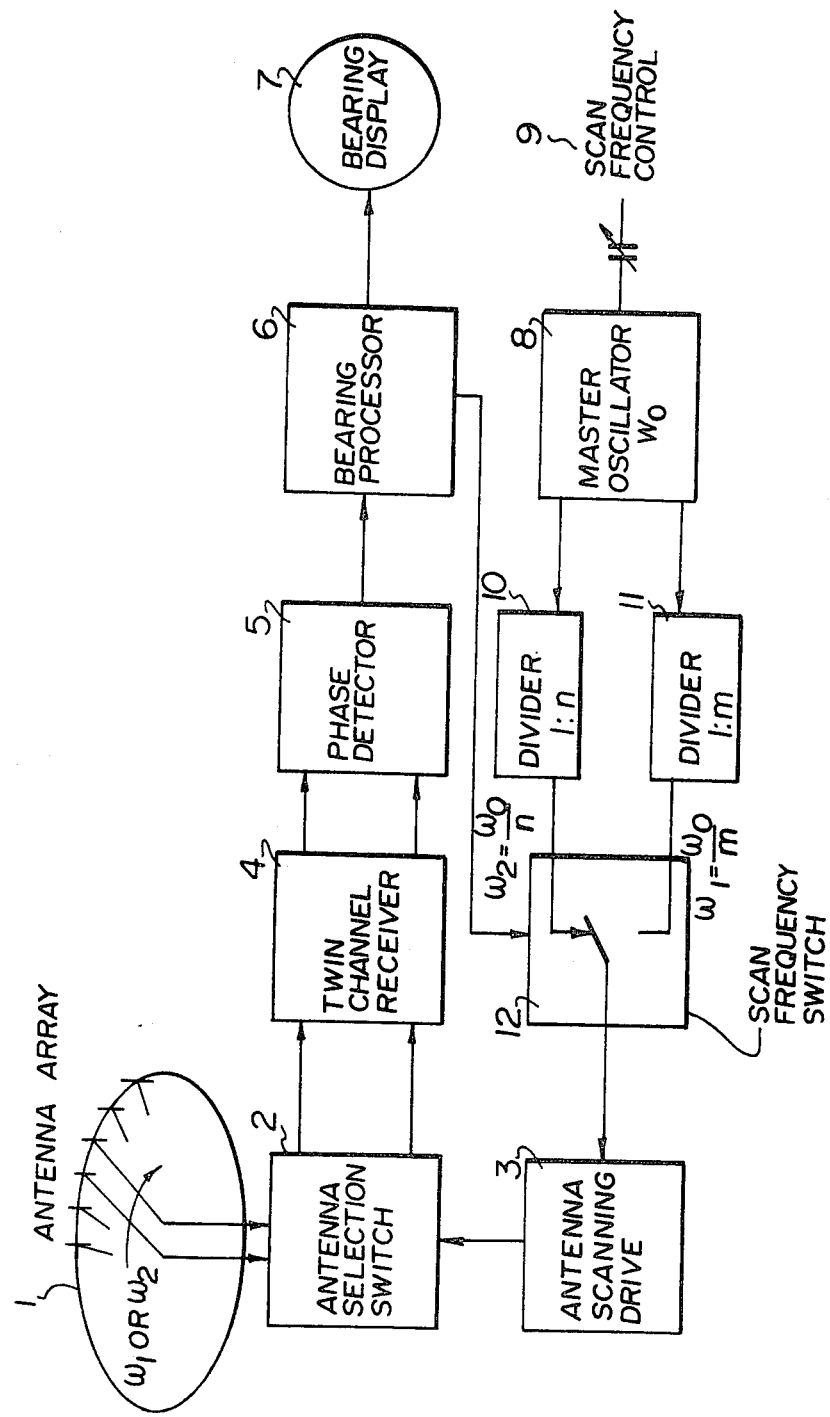
FIG. 3 is a block diagram of a system for carrying out the method according to the invention.

A typical configuration of this embodiment is illustrated in the block diagram of FIG. 3 where (1) is the antenna array made up of a number of dipoles spaced around a circle and connected to the antenna selector switch (2) which is driven by the antenna scanning drive (3) so as to simulate rotation of the antenna at a frequency $\omega_1$ or $\omega_2$.

At any one time the antenna selection switch (2) samples a pair of consecutive dipoles, connecting them to the input of the twin-channel receiver (4) for selection and amplification of the desired signals. The two channels of the twin-channel receiver (4) are matched in-phase so that the relative phase relation $\theta_1$ or $\theta_2$ of signals from the two sampled dipoles is preserved without change at the output of the receiver where it can be measured accurately by the phase detector (5). The phase angle thus measured is applied to the bearing processor (6) which performs the computing functions of cumulative adding and subtracting over the prescribed numbers m and n of antenna scans performed at the scanning velocities of $\omega_1$ and $\omega_2$, respectively. The value of the true bearing $\theta$, computed in accordance with the relation $$\theta = n\theta_2 - m\theta_1$$

is now free of the group delay error and can be indicated on the bearing display (7).

In extension of the embodiment of the above paragraph, the values of $\omega_1$ and $\omega_2$ can be selected as consecutive pairs of subharmonics of a master oscillator such as $\frac{1}{2}$ and $\frac{1}{3}$, $\frac{1}{3}$ and $\frac{1}{4}$, or $\frac{1}{4}$ and 1/5, etc., while simultaneously adjusting the numbers of revolutions m and n to suit the selected ratio. In this configuration the frequency of the master oscillator can be made continuously adjustable by the operator. The purpose of this adjustment is to be able to avoid interference of the scanning frequency with some fixed modulation frequency which may be present on the transmitted carrier. It will be noted that it is the subject of this invention which makes this adjustment feasible since the bearing readout is no longer dependent on the group delay $t_o$ of the receiving system.

Referring to the block diagram of FIG. 3, this extension can be typically illustrated by allowing a master oscillator (8) to generate a frequency $\omega_o$ controllable by means of scan frequency control (9). The output of the master oscillator (8) is then split into two branches and divided in each branch by means of frequency dividers (10) and (11) to give consecutive integral division ratios of m and n, respectively, thus generating frequencies $\omega_1$ and $\omega_2$ so that $$\omega_1 = \omega_0/m \text{ and } \omega_2 = \omega_0/n$$

whereby the exact relations $$\omega_2/\omega_1 = m/n \text{ and } n - m = 1$$

are maintained.

The scanning frequencies $\omega_1$ or $\omega_2$ are selected by the scan frequency switch (12) for application to the antenna scanning drive (3). The scan frequency switch (12) operates on command from the bearing processor (6) to provide the correct number of scans m or n at the respective frequencies $\omega_1$ or $\omega_2$.

What I claim as my invention is:

1. A radio direction finding method comprising scanning a circular antenna array alternately at first and second different angular velocities $\omega_1$ and $\omega_2$, scanning at angular velocity $\omega_1$ being done for m turns and scanning at angular velocity $\omega_2$ being done for n turns, the parameters m, n, $\omega_1$ and $\omega_2$ being related by the formulae $$\omega_2/\omega_1 = m/n \tag{1}$$

and $$n - m = 1 \tag{2}$$

whereby a cancellation of group delay errors in receiving equipment connected to the antenna is obtained by computing the true bearing of a radio target from the formula $$n\theta_2 - m\theta_1 = \theta \tag{3}$$

where $\theta_1$ and $\theta_2$ are radio target bearing readings obtained at the angular velocities $\omega_1$ and $\omega_2$ respectively and $\theta$ is the true bearing angle of said radio target.

2. A method as claimed in claim 1 wherein all the terms in equation (3) are multiplied by a constant k so that $$kn\theta_2 - km\theta_1 = k\theta \tag{4}$$

and bearing readings are integrated over a number of scanning periods to eliminate errors caused by random noise.

3. A radio direction finding system comprising a circular antenna array, means for scanning the antenna array alternately at first and second different angular velocities $\omega_1$ and $\omega_2$, scanning at angular velocity $\omega_1$ being done for m turns and scanning at angular velocity $\omega_2$ being done for n turns, the parameters m, n, $\omega_1$ and $\omega_2$ being related by the formulae $$\omega_2/\omega_1 = m/n \qquad (1)$$

and $$n - m = 1 \qquad (2)$$

whereby a cancellation of group delay errors in receiving equipment connected to the antenna is obtained by means for computing the true bearing of a radio target from the formula $$i\ n\theta_2 - m\theta_1 = \theta \qquad (3)$$

where $\theta_1$ and $\theta_2$ are radio target bearing readings obtained at the angular velocities $\omega_1$ and $\omega_2$ respectively and $\theta$ is the true bearing angle of said radio target.

4. A system as claimed in claim 3 wherein $\omega_1$ and $\omega_2$ are obtained by dividing an output frequency $\omega_o$ of an oscillator by the factors m and n respectively in first and second frequency dividers.

5. A system as claimed in claim 4 wherein switching means is provided for alternately connecting said dividers to the antenna array via an antenna scanning drive and an antenna selector switch.

6. A system as claimed in claim 5 wherein consecutive pairs of antenna elements are connected via the antenna selector switch to a twin-channel receiver, said twin-channel receiver having a pair of outputs connected to inputs of a phase detector having an output connected to a bearing processor which, in turn, is connected to a bearing display.

7. A system as claimed in claim 6 wherein the frequency $\omega_o$ of the oscillator is variable.

* * * * *